Dec. 3, 1963  P. LOHSE  3,112,777
APPARATUS FOR FILLING BAGS OF FLEXIBLE MATERIAL
Filed Oct. 5, 1961  2 Sheets-Sheet 1

Dec. 3, 1963  P. LOHSE  3,112,777
APPARATUS FOR FILLING BAGS OF FLEXIBLE MATERIAL
Filed Oct. 5, 1961  2 Sheets-Sheet 2

United States Patent Office 3,112,777
Patented Dec. 3, 1963

3,112,777
APPARATUS FOR FILLING BAGS OF
FLEXIBLE MATERIAL
Paul Lohse, Stuttgart-Bad Cannstatt, Germany, assignor to Firma Fr. Hesser Maschinenfabrik-Aktiengesellschaft, Stuttgart-Bad Cannstatt, Germany, a corporation of Germany
Filed Oct. 5, 1961, Ser. No. 143,085
Claims priority, application Germany Oct. 14, 1960
7 Claims. (Cl. 141—80)

This invention relates to apparatus for filling flexible bags of polyethylene or like synthetic materials.

In known apparatus of this kind polyethylene bags, which are filled with flour, salt or other powdery or granular materials, become folded when filled with their contents as a result of their lack of inherent stiffness, with the result that not only is the volume of each bag decreased, but also its shape, and consequently its appearance, is impaired. This disadvantage also arises when bags are vibrated on tables or rails to compact the material after filling.

It is known to grip the filled bags at the upper margins thereof by means of grippers and to impart a vibratory movement to the bags through these grippers. Apparatus of the above type, requires comparatively long operating times and, therefore, limits the rate of output of filling machines associated therewith.

An object of the present invention is to obviate these disadvantages and to provide an apparatus which not only permits a rapid and compact filling of bags lacking in stiffness but also produces bags, the walls of which are smooth, and the internal capacity of which is utilized to its fullest extent.

A further object of the present invention is to provide an apparatus for filling bags, particularly of flexible material such, for example, as polyethylene or like synthetic material, comprising at least one measuring out device which discharges into a plurality of circulating pouring chutes, a plurality of discharge nozzles arranged one beneath each pouring chute and movable therewith, at least two clamping jaws pivotally mounted on each discharge nozzle and urged against the side walls thereof, a conveyor device having a plurality of receptacles for conveying the bags beneath said discharge nozzles, each receptacle accompanying a discharge nozzle on movement thereof, and control means for vertically reciprocating said discharge nozzles and the associated clamping jaws and for operating said clamping jaws so that the jaws open at the uppermost point of this reciprocating movement and close at the lowermost point thereof, whereby the bags are each gripped by a discharge nozzle and the associated clamping jaws, raised, filled, and thereafter repeatedly raised from their receptacles and allowed to fall freely back again.

This novel apparatus enables bags of very flexible materials to be filled with very incompact filling material at an increased rate of output so that the filled bags are always firm and free from folds.

Further advantageous features of the invention will be apparent from the following example of a preferred embodiment described with reference to the accompanying diagrammatic drawings. In these drawings.

Figure 1:
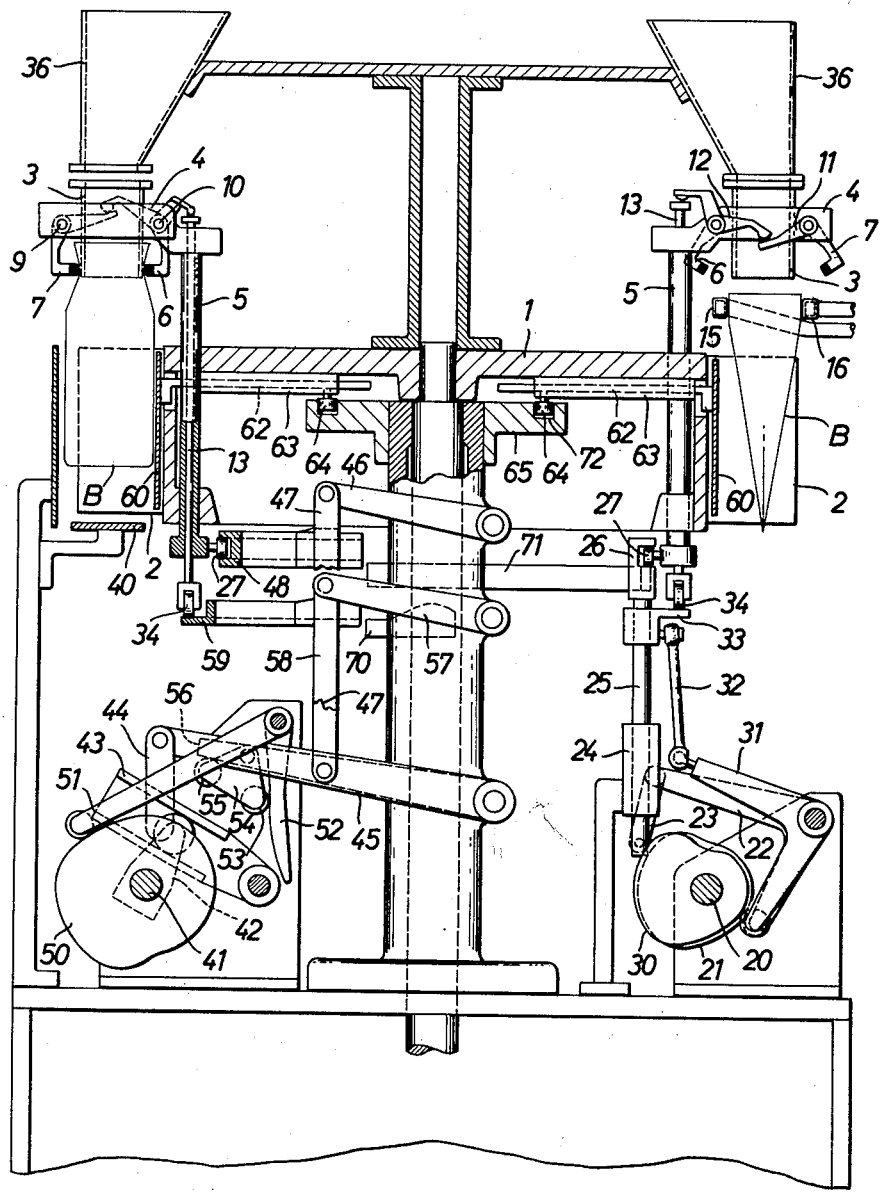
FIGURE 1 is a front view of the apparatus partly in section.

The embodiment illustrated is a filling apparatus of the rotary type having an intermittently rotating conveyor device, for example a drum 1 which is provided with receptacles 2 which are open at the top, bottom and outer side. A discharge nozzle 3 is mounted in a frame 4 directly above each receptacle 2, and these frames 4 are fastened to hollow lifting rods 5 which are mounted for vertical movement in the drum 1. A pair of clamping jaws 6, 7 is also mounted in each frame 4 in such a way that the clamping surfaces thereof are normally maintained urged under the action of torsion springs 8 against the wide sides of the discharge nozzles 3 at the lower end thereof. The clamping jaws 6, 7 are supported by spindles 10, 9 respectively which are pivotally mounted in the frames 4 and connected together by levers 11, 12. For transmission of the control movement to the clamping jaws 6, 7, each lever 12 has a free arm which rests on an associated plunger 13 mounted for displacement in the bore of the associated lifting rod 5.

Figure 2:
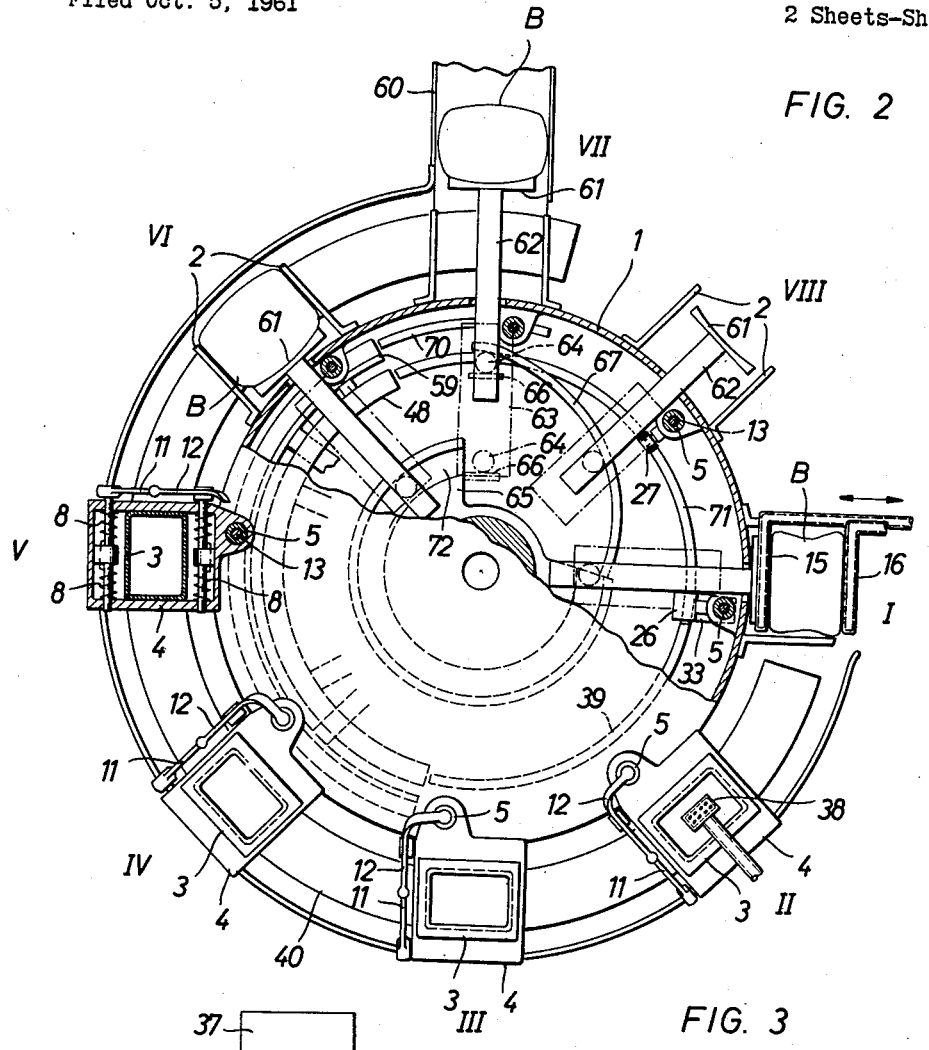
FIGURE 2 is a plan view of the apparatus shown in FIGURE 1, also partly in section.

For filling, each bag B supported in one of the receptacles 2 is opened in the usual way by means of two suction bars 15, 16 at station I (FIGURE 2), the associated discharge nozzle 3 being initially in its upper position, see FIGURE 1. The discharge nozzle 3 is then moved downwards out of this position by the frame 4 under the succeeding control, so that it dips into the mouth of the bag. At the lowermost point of movement of the discharge nozzle 3 the clamping jaws 6, 7 are pivoted on the discharge nozzle 3, as will be described hereafter, and thereby firmly grip the mouth of the bag B against the associated discharge nozzle 3.

This downward movement of the frame 4 with the discharge nozzle 3 and clamping jaws 6, 7 at station I is brought about by a cam plate 21 which is mounted on a control shaft 20 shown in FIGURE 1. This cam plate 21 actuates a rod 25, which is displaceably mounted in a vertical bearing 24, through a bellcrank lever 22 and a bar 23, this rod 25 carrying a yoke 26 in which engages a roller 27 on the lifting rod 5 of the frame 4 which is located directly at station I. The pivoting action of the clamping jaws 6, 7 is controlled by a cam plate 30 which is also mounted on the control shaft 20, this plate 30 actuating a slide 33, which is mounted for sliding movement on the rod 25, through a bellcrank lever 31 and a connecting rod 32. The plunger 13 of the frame 4 which is located directly at station I bears on this movable slide 33 through a roller 34. During lowering of the frame 4, the slide 33 assumes a position such that the clamping jaws 6, 7 are pivoted away from the discharge nozzle 3. When the frame 4, which is controlled by the cam plate 21, reaches its lowermost point, the slide 33 is moved further downwards through a specific distance, so that the clamping jaws 6, 7, which are under spring pressure, clamp the mouth of the bag B firmly against the discharge nozzle 3.

During further travel of the discharge nozzle 3, which has the bag B clamped thereto, towards stations II and III (FIGURE 2), the nozzle is returned to its uppermost position by a stationary cam section 39 (FIGURES 2 and 3) where it comes into direct contact with the accompanying chute 36. Before the bag B is filled at station III by means of a measuring out device 37 of the known type diagrammatically illustrated in FIGURE 3, it is fully opened at station II by means of a blast of compressed air. To this end, a nozzle 38 is fixedly mounted at station II, this nozzle blowing a blast of air through the discharge nozzle 3 into the bag B. The contents of the bag B are compacted at stations IV to VI during travel of the bag from station to station, this being achieved by repeatedly allowing the filled bags to fall freely on to a fixed base rail 40 and raising them again by the discharge nozzle 3 and clamping jaws 6, 7. For this purpose, the discharge nozzle 3 and the associated clamping jaws 6, 7 perform an up and down movement which is so timed that lowering thereof takes up approximately one third of a stroke and raising thereof takes up approximately two thirds of one stroke. This movement is produced by a crank drive which comprises a crank 42, which is mounted on a control shaft 41, a slide 43, a connecting rod 44 and a rocker 45 (FIGURE 1). The rocker 45 forms a parallelogram arrangement together with a lever 46 and a rod 47, an arcuate rail 48 being secured to the rod 47, the groove of which rail is engageable by the rollers 27 of the lifting rods 5.

Control of the clamping jaws 6, 7 for release of the bag B at the uppermost point and for clamping of the same at the lowermost point of movement of the frame 4 is derived from a cam plate 50 which is mounted on the control shaft 41. This cam plate 50 acts through a lever 51 on a lever 52 which has a roller 53 running on the arcuate control surface thereof, said roller 53 being mounted on a triangular shaped drag lever 54 which is pivotally mounted on the rocker 45. This drag lever 54 carries a further roller 55 which supports from below a swinging arm 56 which is mounted for pivoting about the same axis as the rocker 45. This swinging arm 56 forms a further parallelogram arrangement together with a swinging arm 57 and a connecting rod 58, an arcuate rail 59, which supports the rollers 34 of the plunger 13, being fastened to the connecting rod 58 of this parallelogram arrangement. When the levers 51 and 52 are rocked by the cam plate 50, the parallelogram arrangement 56, 57, 58 receives a movement which is superimposed upon the swinging movement of the swinging arm 45; the cam plate 50 merely serves to produce a relative movement between the lifting rod 5 and the plunger 13 which effects opening and closing of the clamping jaws 6, 7. Since this movement is comparatively small, this allows for a cam shape which is technically efficient.

After the compacting of the contents of the bag in the manner described, the bags B are conveyed to station VII and there transferred to the outlet 60 of the apparatus or to a bag closing device. To this end, the inner walls 61 of the receptacles 2 are secured to slides 62 which are mounted in guides 63 for movement radially of the drum 1. These slides 62 carry rollers 64 which are guided in a segmental annular groove 72 in a stationary plate 65 at stations I to VII. At station VII the slides 62 are each moved outwardly by means of a radially reciprocating bar 66 thereby to eject the bags, which pass into the outlet 60.

The slide 62 is returned to its inner position by means of a fixed cam plate 67 during the next rotational step of the drum 1. To effect release of the bag, the clamping jaws 6, 7 are pivoted away from the discharge nozzle 3 at station VII by means of a fixed rail 70, whilst the discharge nozzle 3 is held in its upper position by means of a fixed rail 71.

Figure 3:
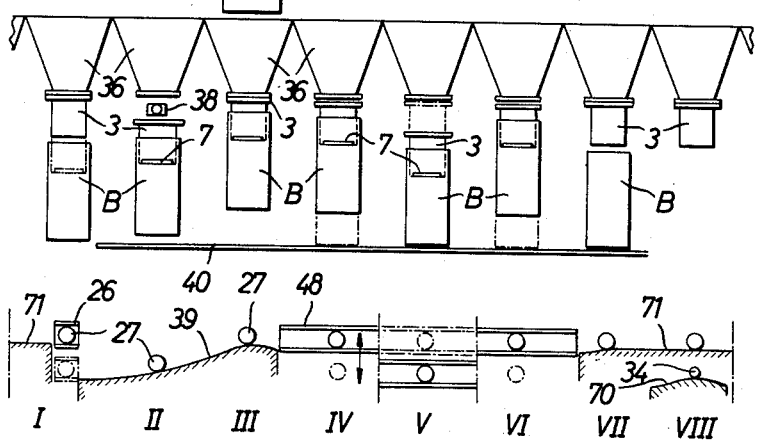
FIGURE 3 is a developed view of the apparatus illustrated in FIGURES 1 and 2.

FIGURE 3 may be referred to for a clearer understanding of the operating procedure of the apparatus.

The bags B need not necessarily be filled in one operation. For example, in the case of particularly incompact filling commodities, of which the initial volume to be discharged into a bag is larger than the actual volume of the bag itself, only part of the filling commodity is first discharged into the bag, the bag may then be vibrated once or many times, and the remainder of the filling material is thereupon discharged into the bag which is vibrated again.

I claim:

1. Apparatus for filling bags of flexible material, comprising, in combination, at least one material-measuring out device, a support, a plurality of pouring chutes carried by said support, means for moving said support intermittently through a number of stations to move said chutes successively beneath said measuring out device to receive measured out quantities of material therefrom, a discharge nozzle having side walls arranged beneath each pouring chute and movable therewith through said stations, at least two clamping jaws pivotally mounted on each said discharge nozzle, means urging said jaws against the side walls of the associated nozzle, a receptacle arranged beneath each discharge nozzle, a conveyor device for moving the receptacles intermittently with said support, control means at a first station for lowering a discharge nozzle and the associated clamping jaws and for closing said jaws to clamp the mouth of the bag carried by the receptacle at this station against the discharge nozzle, means at a second station for raising said discharge nozzle, associated clamping jaws and bag clamped thereby, means for initiating operation of said measuring out device to discharge a quantity of material into the bag at the second station, means extending over further succeeding stations for successively opening the clamping jaws to release the bag thereby to allow the same to fall back into the accompanying receptacle and for lowering the discharge nozzle and the associated clamping jaws after each release of the bag and for reclosing the jaws to successively reclamp the bag to said nozzle whereby the bag is successively shaken, and means at a further succeeding station for ejecting the bag from the apparatus.

2. Apparatus for filling bags of flexible material, comprising, in combination, at least one material-measuring out device, a support, a plurality of pouring chutes carried by said support, means for moving said support intermittently to move said chutes successively beneath said measuring out device to receive measured out quantities of material therefrom, a discharge nozzle having side walls arranged beneath each pouring chute and movable therewith, at least two clamping jaws pivotally mounted on each said discharge nozzle, means urging said jaws against the side walls of the associated nozzle, a receptacle arranged beneath each discharge nozzle, a conveyor device for moving the receptacles intermittently with said support, a frame in which is mounted said discharge nozzle and the associated clamping jaws, a hollow lifting rod on which is mounted said frame and which is mounted for vertical displacement in said conveyor device, a plunger displaceably mounted in the bore of said lifting rod and co-operating with the associated clamping jaws, and means for imparting vertical reciprocating movement to the discharge nozzle and the associated clamping jaws through said lifting rod and for imparting movement to said clamping jaws through said plunger to move said jaws relatively to the nozzle.

3. Apparatus for filling bags of flexible material, comprising, in combination, at least one material-measuring out device, a support, a plurality of pouring chutes carried by said support, means for moving said support intermittently to move said chutes successively beneath said measuring out device to receive measured out quantities of material therefrom, a discharge nozzle having side walls arranged beneath each pouring chute and movable therewith, at least two clamping jaws pivotally mounted on each said discharge nozzle, means urging said jaws against the side walls of the associated nozzle, a receptacle arranged beneath each discharge nozzle, a conveyor device for moving the receptacles intermittently with said support, a frame in which is mounted said discharge nozzle and the associated clamping jaws, a hollow lifting rod on which is mounted said frame and which is mounted for vertical displacement in said conveyor device, a plunger displaceably mounted in the bore of said lifting rod and co-operating with the associated clamping jaws, a parallelogram arrangement for imparting reciprocating movement to said hollow lifting rod to thereby reciprocate said discharge nozzle and associated clamping jaws, a crank drive connected to said parallelogram arrangement for actuating the same, a further parallelogram arrangement for imparting a vertical reciprocating movement to said plunger to produce a relative movement between the lifting rod and the associated plunger and to thereby move the associated clamping jaws relatively to the nozzle, and a cam plate co-operable with said further parallelogram arrangement for actuating the same.

4. Apparatus as claimed in claim 3, further comprising a shaft on which is mounted said crank drive and cam plate, an arm having a roller in contact with said cam plate, a lever connected to said arm, a rocker which forms part of said parallelogram arrangement, a swinging arm which forms part of said further parallelogram arrangement, a drag lever pivotally mounted on said rocker and having a roller in contact with said lever and a further roller in contact with said swinging arm.

5. Apparatus for filling bags of flexible material, comprising, in combination, a frame, at least one material-measuring out device mounted on said frame, a support, a plurality of pouring chutes carried by said support, means for moving said support intermittently through a number of stations to move said chutes successively beneath said measuring out device to receive measured out quantities of material therefrom, a discharge nozzle having side walls arranged beneath each pouring chute and movable therewith, at least two clamping jaws pivotally mounted on each said discharge nozzle, means urging said jaws against the side walls of the associated nozzle, a receptacle arranged beneath each discharge nozzle, a conveyor device for moving the receptacles intermittently with said support, at least two suction bars mounted on said frame above the receptacles at the station at which the bags to be filled are fed in into the apparatus, the suction bars being operative to guide the bags into said receptacles and to open said bags, and control means for imparting vertical reciprocating movement to the discharge nozzle and associated clamping jaws and for moving said clamping jaws relative to said nozzle.

6. Apparatus as claimed in claim 5, further including means for lowering each discharge nozzle and the associated clamping jaws at the station at which the bags are fed into the apparatus, said means comprising a cam plate, a bellcrank lever in engagement with said cam plate, a bar connected at one end to said bellcrank lever and at the other end to a rod, a yoke secured to said rod, a plurality of vertically movable hollow lifting rods each carrying a discharge nozzle and the associated clamping jaws and having means engageable with said yoke, and means for moving the clamping jaws relatively to the nozzles at this station, said means comprising a cam plate, a bellcrank lever in engagement with said cam plate, a connecting rod secured at one end to said bellcrank lever and at the other end to a slide which is mounted for sliding movement on the rod of the discharge nozzle-lowering means, a plurality of plungers each mounted for vertical displacement in the bore of a lifting rod and for co-operation with the clamping jaws associated with the lifting rod, said plungers having means engageable with said slide.

7. Apparatus for filling bags of flexible material, comprising, in combination, a base frame, at least one material-measuring out device mounted on said base frame, a support, a plurality of pouring chutes carried by said support, means for moving said support intermittently through a number of stations to move said chutes successively beneath said measuring out device to receive measured out quantities of material therefrom, a discharge nozzle having side walls arranged beneath each pouring chute and movable therewith through said stations, at least two clamping jaws pivotally mounted on said discharge nozzle, means urging said jaws against the side walls of the associated nozzle, a receptacle arranged beneath each discharge nozzle, a conveyor device for moving the receptacles intermittently with said support, a frame on which is mounted said discharge nozzle and the associated clamping jaws, movement transmission means mounted on said base frame at the station at which the bags to be filled are fed in into the apparatus for engagement by the frame carrying the discharge nozzle and associated clamping jaws and by the clamping jaws, means for actuating said transmission means to impart a movement thereto to lower the frame carrying the discharge nozzle and clamping jaws and to close said clamping jaws, movement transmission means mounted on said base frame and extending over at least one further succeeding station for engagement by the frame carrying the discharge nozzle and associated clamping jaws and by the clamping jaws, means for actuating said transmission means to impart a succession of vertical reciprocating strokes therethrough to the frame carrying the discharge nozzle and associated clamping jaws and to open said clamping jaws at the top of each stroke and to close said jaws at the bottom of each stroke whereby each bag is dropped and lifted a succession of times.

References Cited in the file of this patent
UNITED STATES PATENTS

| 619,834 | Nickerson | Feb. 21, 1899 |
| 1,667,930 | Edmunds | May 1, 1928 |
| 2,654,518 | Kindseth | Oct. 6, 1953 |
| 2,725,168 | Lindstaedt et al. | Nov. 29, 1955 |

FOREIGN PATENTS

| 465,086 | Germany | Sept. 6, 1928 |
| 145,927 | Australia | Nov. 28, 1952 |